United States Patent
Yang et al.

(10) Patent No.: US 11,576,314 B2
(45) Date of Patent: Feb. 14, 2023

(54) PLANT CULTIVATING APPARATUS

(71) Applicant: LG Electronics Inc., Seoul (KR)

(72) Inventors: Mina Yang, Seoul (KR); Youngsuk Kim, Seoul (KR)

(73) Assignee: LG Electronics Inc., Seoul (KR)

( * ) Notice: Subject to any disclaimer, the term of this patent is extended or adjusted under 35 U.S.C. 154(b) by 195 days.

(21) Appl. No.: 16/681,757

(22) Filed: Nov. 12, 2019

(65) Prior Publication Data

US 2020/0146231 A1    May 14, 2020

(30) Foreign Application Priority Data

Nov. 12, 2018   (KR) .................. 10-2018-0138272

(51) Int. Cl.
*A01G 27/00* (2006.01)
*A01G 9/02* (2018.01)
*A01G 9/04* (2006.01)

(52) U.S. Cl.
CPC ........... *A01G 27/005* (2013.01); *A01G 9/023* (2013.01); *A01G 9/045* (2013.01); *A01G 9/047* (2013.01)

(58) Field of Classification Search
CPC ...... A01G 27/005; A01G 9/023; A01G 9/045; A01G 9/047
See application file for complete search history.

(56) References Cited

U.S. PATENT DOCUMENTS

| | | | | |
|---|---|---|---|---|
| 4,887,388 | A * | 12/1989 | Waltel, Jr. | A01G 25/02 47/79 |
| 5,046,282 | A * | 9/1991 | Whitaker | A01G 27/003 47/79 |
| 5,673,511 | A * | 10/1997 | Holtkamp, Jr. | A47F 7/0078 47/87 |
| 7,020,997 | B1 * | 4/2006 | Thomas | A01G 9/028 47/39 |

(Continued)

FOREIGN PATENT DOCUMENTS

| | | |
|---|---|---|
| EP | 3005861 | 4/2016 |
| KR | 101240375 | 3/2013 |
| WO | WO2018202405 | 11/2018 |

OTHER PUBLICATIONS

Extended European Search Report in European Application No. 19208471.3, dated Mar. 26, 2020, 9 pages.

*Primary Examiner* — Joshua J Michener
*Assistant Examiner* — Megan J Moroney
(74) *Attorney, Agent, or Firm* — Fish & Richardson P.C.

(57) ABSTRACT

The present disclosure relates to a plant cultivating apparatus. The plant cultivating apparatus according to an aspect of the present disclosure includes a body configured to have a cultivation chamber therein, a water storage configured to be disposed in the body and store water, a water supply bed configured to be disposed at one side of the cultivation chamber and have a water supply flow path receiving water from the water storage, and a cultivation port configured to be seated on the water supply bed and receive water from the (Continued)

water supply flow path, in which the cultivation port includes a suction member disposed in the cultivation port and suctioning water stored in the water supply flow path, and a medium disposed above the suction member, receiving water from the suction member, and storing nutrients required for plant growth.

20 Claims, 5 Drawing Sheets

(56) References Cited

U.S. PATENT DOCUMENTS

| | | | |
|---|---|---|---|
| 7,845,114 B2 * | 12/2010 | Kirtz | A01G 9/045 47/87 |
| 8,910,419 B1 * | 12/2014 | Oberst | A01G 31/06 47/60 |
| 9,655,304 B2 * | 5/2017 | Hashimoto | E04D 11/002 |
| 10,555,464 B1 * | 2/2020 | Leeworthy | A01G 9/02 |
| 10,973,186 B2 * | 4/2021 | Blackburn | A01G 9/028 |
| 2016/0113221 A1 | 4/2016 | Wu et al. | |
| 2018/0054986 A1 | 3/2018 | Fu et al. | |
| 2018/0125022 A1 * | 5/2018 | Moran | A01G 27/003 |
| 2018/0325038 A1 * | 11/2018 | Spiro | A01G 9/047 |

* cited by examiner

PLANT CULTIVATING APPARATUS

CROSS-REFERENCE TO RELATED APPLICATIONS

The present application claims the benefit of priority to Korean Patent Application No. 10-2018-0138272, filed on Nov. 12, 2018, which is herein incorporated by reference in its entirety.

BACKGROUND

The present disclosure relates to a plant cultivating apparatus.

The general plant cultivating apparatus forms a preset cultivation chamber having an environment suitable for plant growth, and stores plant in the preset cultivation chamber. The plant cultivating apparatus is provided with a configuration for supplying nutrients and light energy necessary for plant growth, and the plant is grown by the nutrients and light energy supplied. For example, in Korean Patent No. 10-1240375, a technology related to "Plant Cultivating apparatus" is disclosed.

According to the prior art, the nutrient solution supplied to the cultivation bed flows out to a recovery pipe having a constant height, and a constant water level is maintained by the recovery pipe. However, since a certain level of nutrient solution is still stored in the cultivation bed, hygiene problems are caused in the cultivation bed by the nutrient solution. In other words, when a nutrient solution containing nutrients are stored for a long time, a problem that germ, bacteria, or the like grows in the nutrient solution occurs.

SUMMARY

An object of the present disclosure is to provide a plant cultivating apparatus which can prevent a water supply bed from being contaminated by the nutrient solution remaining in the water supply bed.

An object of the present disclosure is to provide a plant cultivating apparatus which can prevent problems that may occur due to hydroponic cultivation.

The plant cultivating apparatus according to the present disclosure includes a water supply bed configured to supply water, and a plurality of cultivation ports configured to receive water from the water supply bed and be seated on the water supply bed, and thus a variety of plants can be grown in the plurality of cultivation ports.

According to the plant cultivating apparatus according to the present disclosure, the cultivation port includes a medium for storing nutrients required for plant growth and a suction member for suctioning water from the water supply bed and supplying the water to the medium, and thus nutrients and water required for plant growth can be appropriately supplied.

The plant cultivating apparatus according to the present disclosure can prevent contamination of the water supply bed by supplying water from the water supply bed and suctioning water supplied from the water supply bed to form a nutrient solution in the cultivation port.

According to the present disclosure, since nutrients required for plant growth are provided in the cultivation port, and water supplied to the water supply bed is suctioned into the cultivation port and supplied to the plant, contamination by water remaining in the water supply bed can be minimized.

According to the present disclosure, a plurality of cultivation ports can be configured to be separated from the water supply bed to facilitate maintenance of the cultivation ports.

According to the present disclosure, the water supply pipes formed in the plurality of cultivation ports should be connected to the water supply flow path formed in the water supply bed, so that water is supplied to the cultivation port and thus the amount of water supplied into the cultivation port can be adjusted by the supply amount of water flowing into the water supply flow path.

DETAILED DESCRIPTION OF THE EMBODIMENTS

Figure 1:
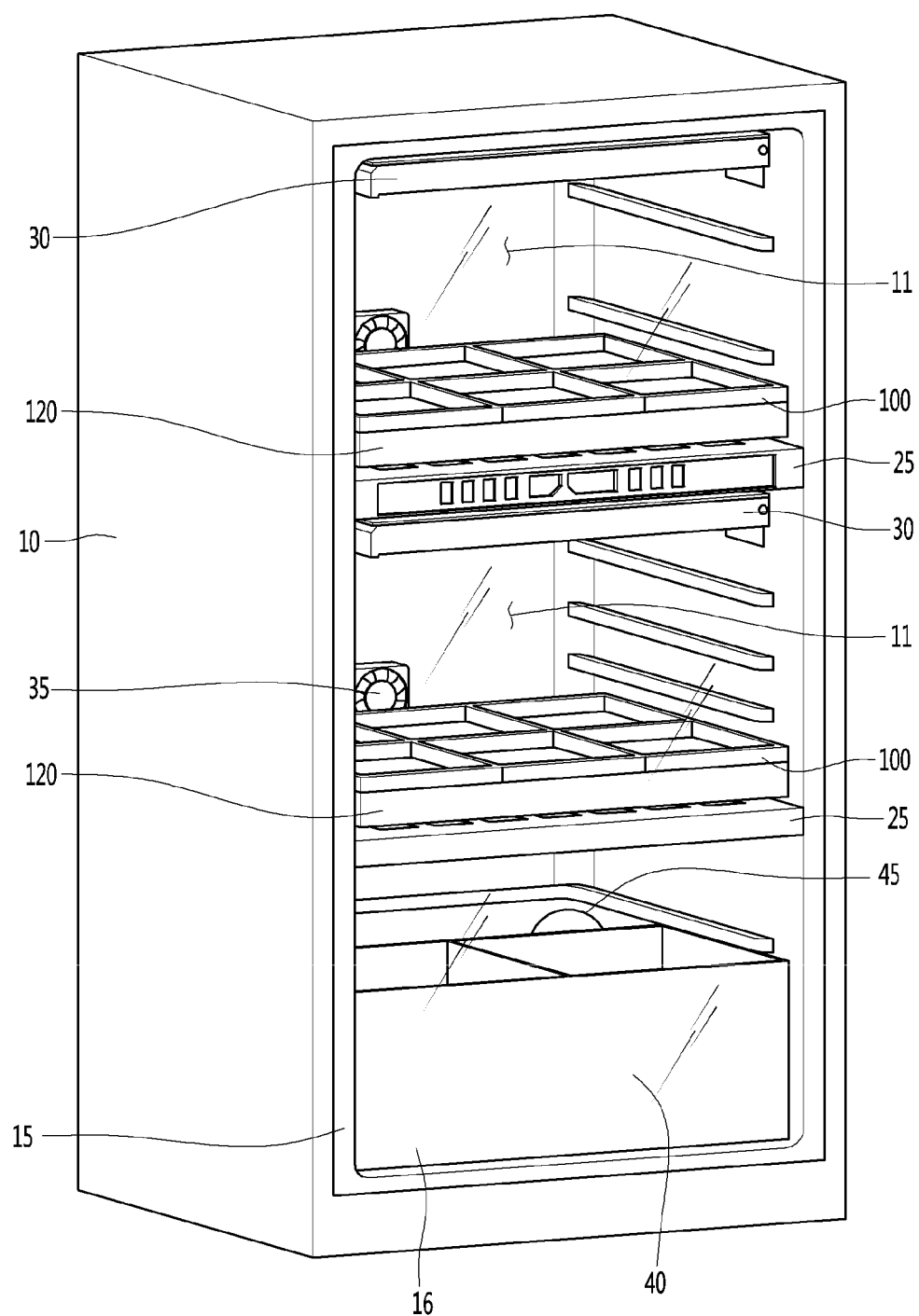
FIG. 1 is a perspective view illustrating a plant cultivating apparatus according to a first embodiment of the present disclosure.

Hereinafter, some embodiments of the present disclosure will be described in detail with reference to the accompanying drawings. In adding reference numerals to the components of each drawing, it should be noted that the same reference numerals are assigned to the same components as much as possible even though they are illustrated in different drawings. In addition, in describing the embodiments of the present disclosure, when it is determined that a detailed description of a related well-known configuration or function interferes with the understanding of the embodiments of the present disclosure, the detailed description thereof will be omitted.

In addition, in describing the components of the embodiments of the present disclosure, terms such as first, second, A, B, (a), and (b) may be used. These terms are only for distinguishing the components from other components, and the nature, sequence, or order of the components are not limited by the terms. If a component is described as being "connected", "coupled" or "accessed" to another component, that component may be directly connected or accessed to that other component, but it is to be understood that another component may be "connected", "coupled" or "accessed" between each component.

Figure 2:
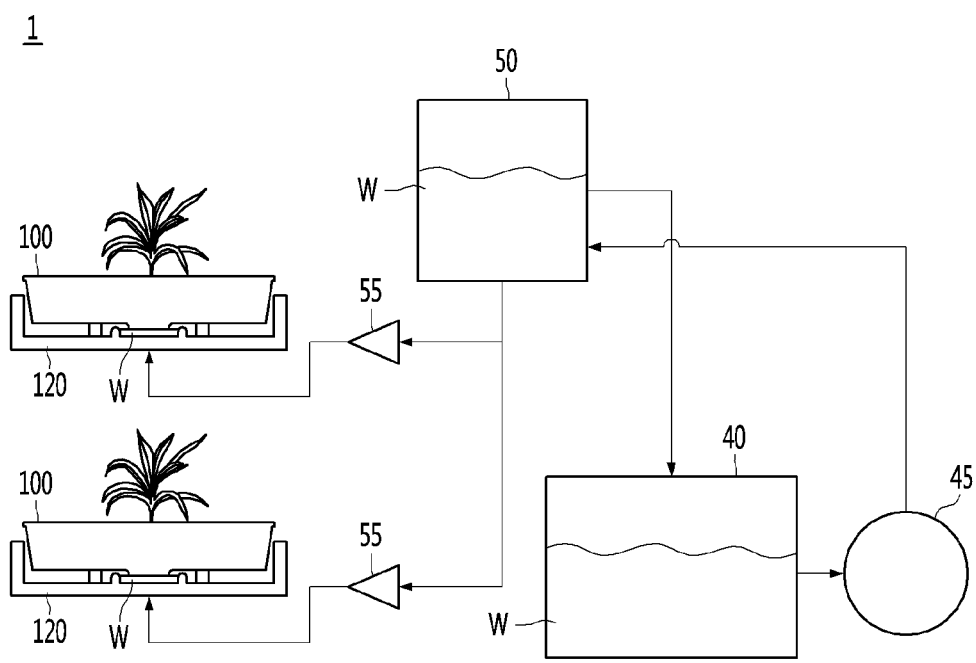
FIG. 2 is view illustrating a configuration of a plant cultivating apparatus according to the first embodiment of the present disclosure.

FIG. 1 is a perspective view illustrating a plant cultivating apparatus according to a first embodiment of the present disclosure, and FIG. 2 is view illustrating a configuration of a plant cultivating apparatus according to the first embodiment of the present disclosure.

Referring to FIGS. 1 and 2, the plant cultivating apparatus 1 according to the present disclosure may include a body 10. The body 10 may be formed so that one side thereof is opened. An inner space may be formed in the body 10. The door 15 may be disposed at an opened side of the body 10. The door 15 may selectively shield one opened side of the body 10. The door 15 and the body 10 may be connected by a hinge. The door 15 may be provided with a front glass 16. The inner space of the body 10 may be exposed to the outside by the front glass 16.

The plant cultivating apparatus 1 may include a water supply bed 120. The water supply bed 120 may be disposed in the inner space of the body 10. The water supply bed 120 may store the water W required for the growth of the plant. Without being limited thereto, the water supply bed 120 may store nutrient solution including nutrients required for plant growth. The water supply bed 120 may be equipped with a cultivation port 100 to be described later. Plants are sown in the cultivation port 100, and the cultivation port 100 may receive water from the water supply bed 120. For example, the water supply bed 120 may include a bed body formed in a polygon in which one surface is opened. The water supply bed 120 may be fixed in the body 10. Alternatively, the water supply bed 120 may be configured to be movable relative to the body 10.

A plurality of water supply beds 120 may be provided. The plurality of water supply beds 120 may be disposed so as to be spaced apart from each other in the vertical direction in the body 10. A bed pedestal 25 for supporting the water supply bed 120 may be provided in the body 10. The bed pedestal 25 may be configured to be movable relative to the body 10. In addition, the bed pedestal 25 may be fixed to the body 10. When the bed pedestal 25 is configured to be movable relative to the body 10, the water supply bed 120 may be moved by the bed pedestal 25. When the bed pedestal 25 is fixed to the body 10, the water supply bed 120 may slide in the bed pedestal 25.

The plant cultivating apparatus 1 may include a cultivation port 100. A plurality of cultivation ports 100 may be provided. The cultivation port 100 may be mounted on the water supply bed 120. In the present embodiment, the water supply bed 120 may be equipped with a plurality of cultivation ports 100. The cultivation port 100 mounted on the water supply bed 120 may receive water from the water supply bed 120. The cultivation port 100 may be separated from the water supply bed 120. The cultivation port 100 may be separated from the water supply bed 120 so that plants may be sown in the cultivation port 100 or grown plants can be harvested.

The plant cultivating apparatus 1 may include a light source module 30. The light source module 30 may be disposed in the body 10. The light source module 30 may be disposed above the cultivation port 100. The light source module 30 may supply light energy to a plant growing in the cultivation port 100. The light source module 30 may include a light source for generating light, a power supply unit supplying power to the light source, a reflecting plate reflecting light, and the like. The light source module 30 may further include a cooling unit for cooling the light source. The cooling unit may cool the heat generated by the light source to improve the life of the light source. A cultivation chamber 11 may be defined between the cultivation port 100 and the light source module 30. The cultivation chamber 11 can be understood as a space in which plants sown in the cultivation port 100 can grow.

One side of the cultivation chamber 11 may be provided with a ventilation unit 35. The ventilation unit 35 may be provided in the body 10. The ventilation unit 35 may supply outside air to the inside of the cultivation chamber 11. The ventilation unit 35 may be provided as a blowing fan. The ventilation unit 35 may selectively communicate the cultivation chamber 11 and external space with each other. The ventilation unit 35 may supply outside air into the cultivation chamber 11 to control humidity, carbon dioxide concentration, and the like in the cultivation chamber 11.

The plant cultivating apparatus 1 may include a main storage unit 40. The main storage unit 40 may be disposed in the body 10. Water (W) may be stored in the main storage unit 40. Without being limited thereto, a nutrient solution may be stored in the main storage unit 40. The main storage unit 40 may be disposed under the body 10. For example, the main storage unit 40 may include a hot water tank and a cold water tank. Water stored in each of the hot water tank and the cold water tank may be supplied to the water supply bed 120. The water of different temperatures stored in the hot water tank and the cold water tank may be mixed and supplied to the water supply bed 120. For example, the temperature of the water present in the water supply bed 120 may be measured, and water of a predetermined temperature based on the measured temperature may be supplied.

The plant cultivating apparatus 1 may include a pump 45. The pump 45 may be disposed at one side of the main storage unit 40. Water stored in the main storage unit 40 may be supplied to an auxiliary storage unit 50 to be described later by the pump 45. The pump 45, the main storage unit 40, and the auxiliary storage unit 50 may be connected by pipes. Water stored in the main storage unit 40 may be supplied to the auxiliary reservoir 50 through a pipe.

The plant cultivating apparatus 1 may include an auxiliary storage unit 50. The auxiliary storage unit 50 may store water supplied from the main storage unit 40. The auxiliary storage unit 50 may be located above the main storage unit 40. The auxiliary storage unit 50 may be understood as a configuration for distributing water supplied from the main storage unit 40 to the water supply bed 120. The auxiliary storage unit 50 may be connected to the pump 45 and the main storage unit 40 by a pipe. In this case, a pipe to which the pump 45 and the auxiliary storage unit 50 are connected may be defined as a supply pipe. A pipe to which the main storage unit 40 and the auxiliary storage unit 50 are connected may be defined as a recovery pipe.

In the present embodiment, the auxiliary storage unit 50 may store a preset amount of water. The water that may be stored in the auxiliary storage unit 50 may be adjusted according to the storage amount of water that may be stored in the water supply bed 120. For example, the total storage amount of water that can be stored in each of the plurality of water supply beds 120 may correspond to the storage amount that may be stored in the auxiliary storage unit 50. When more than a preset amount of water is stored in the auxiliary storage unit 50, the excess amount of water may be recovered to the main storage unit 40. For this purpose, the recovery pipe may be located above the supply pipe. The recovery pipe may be disposed at a water level in which a preset amount of water is stored. In other words, when more than a preset amount of water is stored, the excess amount of water may be recovered to the main storage unit 40 through the recovery pipe. When water is recovered to the main storage unit 40 by the recovery pipe, the operation of the pump 45 may be stopped to limit the supply of water to the auxiliary storage unit 50. The auxiliary storage unit 50 may supply water to a plurality of water supply beds 120 when a preset amount of water is stored. The water stored in the auxiliary storage unit 50 may be all supplied to the water supply bed 120. In order to supply additional water to the water supply bed 120, the pump 45 may be operated to store water again in the auxiliary storage unit 50, and then additionally supply the water to the water supply bed 120.

Whether the water supplied from the auxiliary storage unit 50 to the water supply bed 120 is supplied may be controlled by the valve 55. The valve 55 may be provided in a pipe connecting the auxiliary storage unit 50 and the water supply bed 120. The opening degree of the valve 55 may be adjusted to adjust whether the water supplied to the water supply bed 120 is supplied. Although it is described that the valve 55 is provided in the present embodiment, the valve 55 may not be provided. When the valve 55 is not provided, the diameter of the pipe for supplying water to the plurality of water supply beds 120 may be varied. For example, the diameter of the pipe for supplying water to the water supply bed 120 which is positioned above among the plurality of water supply beds 120 may be smaller than the diameter of the pipe for supplying water to the water supply bed 120 which is positioned below among the plurality of water supply beds 120. In other words, by adjusting the diameter of the pipe to which the water is supplied, the water supplied to the water supply bed 120 positioned above and the water supply bed 120 positioned below may be equally supplied. Meanwhile, in the present disclosure, the main storage unit 40 and the auxiliary storage unit 50 may be referred to as water storage units.

Figure 3:
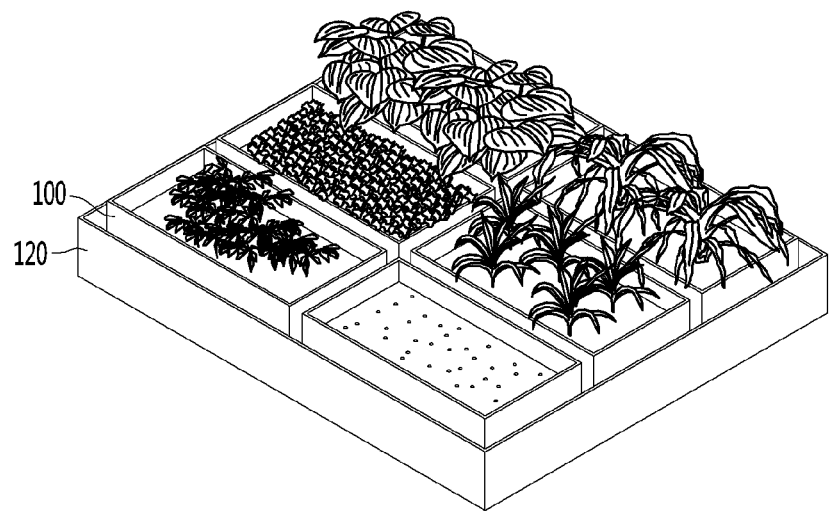
FIG. 3 is a perspective view illustrating a cultivation port and a water supply bed according to the first embodiment of the present disclosure.
Figure 4:
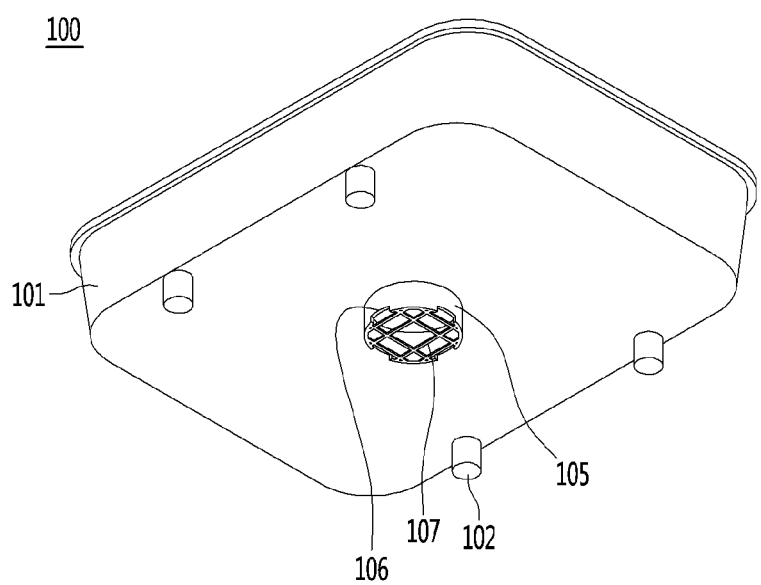
FIG. 4 is a bottom view illustrating the cultivation port according to the first embodiment of the present disclosure.
Figure 5:
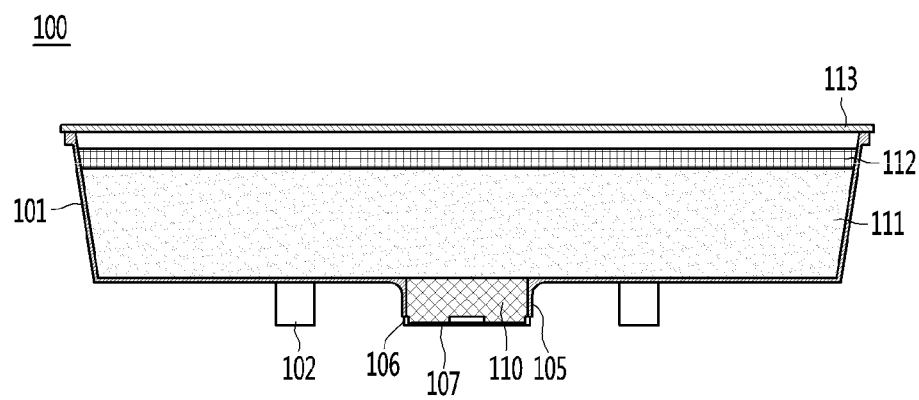
FIG. 5 is a sectional view illustrating a cultivation port according to the first embodiment of the present disclosure.
Figure 6:
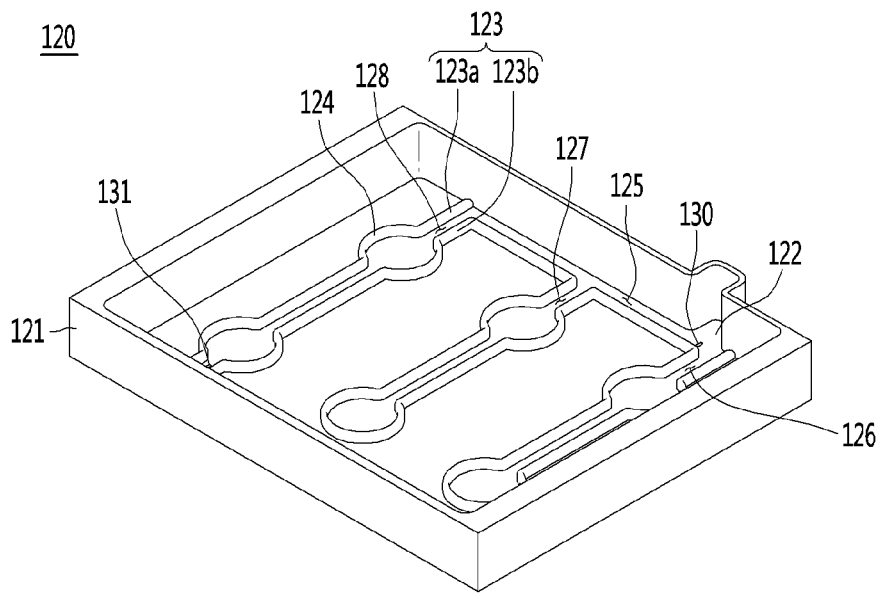
FIG. 6 is a perspective view illustrating a water supply bed according to the first embodiment of the present disclosure.
Figure 7:
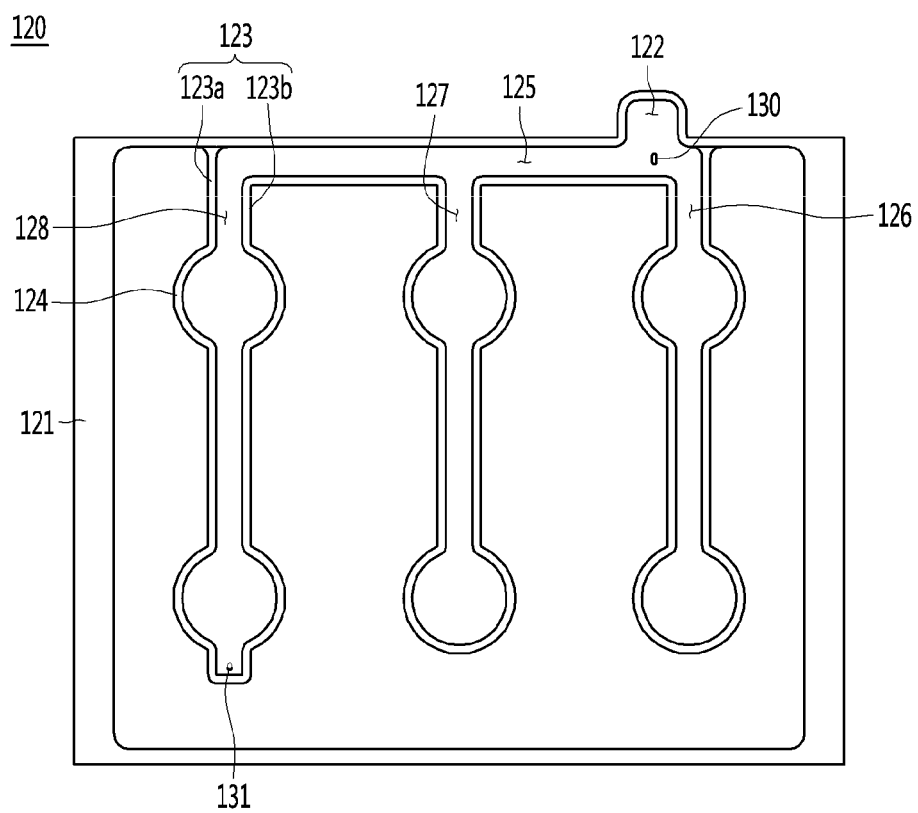
FIG. 7 is a plan view illustrating a water supply bed according to the first embodiment of the present disclosure.

FIG. 3 is a perspective view illustrating a cultivation port and a water supply bed according to the first embodiment of the present disclosure, FIG. 4 is a bottom view illustrating the cultivation port according to the first embodiment of the present disclosure, FIG. 5 is a sectional view illustrating a cultivation port according to the first embodiment of the present disclosure, FIG. 6 is a perspective view illustrating a water supply bed according to the first embodiment of the present disclosure, and FIG. 7 is a plan view illustrating a water supply bed according to the first embodiment of the present disclosure.

Referring to FIGS. 3 to 7, a plurality of cultivation ports 100 may be seated in the water supply bed 120 according to the present disclosure. The plurality of cultivation ports 100 seated on the water supply bed 120 may be separated from the water supply bed 120. Various plants may be sown in each of the plurality of cultivation ports 100. The plurality of cultivation ports 100 may be supplied with water by the water supply bed 120.

Hereinafter, the cultivation port 100 will be described in detail with reference to the drawings.

Referring to FIGS. 4 and 5, the cultivation port 100 according to the present disclosure may include a port body 101 forming a body. In the present embodiment, the cultivation port 100 may be formed as a polygon in which one surface is opened. The cultivation port 100 may be formed in a basket shape by recessing a portion of one surface which is opened. The medium 111 containing the nutrients required for the growth of the plant may be disposed in the cultivation port 100.

The cultivation port 100 may include a body pedestal 102. The body pedestal 102 may protrude downward from the bottom surface of the port body 101. A plurality of body pedestals 102 may be provided. The body pedestal 102 may be supported on the inner bottom surface of the water supply bed 120 when the cultivation port 100 is seated on the water supply bed 120. The body pedestal 102 may protrude further downward than a water supply pipe 105 to be described later. When the body pedestal 102 protrudes further downward than the water supply pipe 105, a gap through which water may pass may be formed between the water supply pipe 105 and an inner bottom surface of the water supply bed 120. Meanwhile, the body pedestal 102 is not provided, the bottom surface of the cultivation port 100 may be seated in the water supply bed 120.

The cultivation port 100 may include a water supply pipe 105. The water supply pipe 105 may protrude downward from the bottom surface of the port body 101. The water supply pipe 105 may be formed hollow inside. The hollow formed in the water supply pipe 105 may be in communication with the inner space of the cultivation port 100. The water supply pipe 105 may be understood as a passage through which the water stored in the water supply bed 120 is supplied to the medium 111 disposed in the cultivation port 100. A portion of the water supply pipe 105 may be in contact with water stored in the water supply bed 120. Water may flow into the hollow of the water supply pipe 105 by a portion of the water supply pipe 105 which is in contact with the water. In the present embodiment, the water supply pipe 105 may be disposed at the center of the bottom surface of the port body 101. The position of the water supply pipe 105 may be variously changed at the bottom surface of the port body 101.

The water supply pipe 105 may include a recessed portion 106. The recessed portion 106 may be formed by recessing a portion of the water supply pipe 105. The recessed portion 106 may be disposed at one end portion of the water supply pipe 105. The recessed portion 106 may be formed by recessing one end portion of the water supply pipe 105. For example, the recessed portion 106 may be recessed in a direction toward the bottom surface of the port body 101 from one end portion of the water supply pipe 105 protruding downward from the port body 101. A plurality of recessed portions 106 may be provided. The recessed portion 106 may be understood as a passage through which a portion of the water supply pipe 105 is opened and water stored in the water supply bed 120 passes. In other words, the water stored in the water supply bed 120 may smoothly flow into the hollow of the water supply pipe 105 by the recessed portion 106.

The water supply pipe 105 may include a porous portion 107. The porous portion 107 may filter foreign matters contained in the water flowing into the hollow of the water supply pipe 105. In addition, the porous portion 107 may prevent a suction member 110 to be described later from being separated from the water supply pipe 105. The porous portion 107 may be provided at one end portion of the water supply pipe 105. The porous portion 107 may cover the hollow of the water supply pipe 105 at one end portion of the water supply pipe 105. The porous portion 107 may include a plurality of pores. Water stored in the water supply bed 120 may pass through the plurality of pores and flow into the hollow of the water supply pipe 105. The foreign matters may be filtered by a size-exclusion mechanism in a process of passing the water through the plurality of pores.

The suction member 110 may be included in the port body 101. The suction member 110 may be disposed in the hollow of the water supply pipe 105. The suction member 110 may suction water flowing into the hollow of the water supply pipe 105. The suction member 110 may transfer the suctioned water to the medium 111 to be described later. In other words, the suction member 110 may perform a function of suctioning water flowing into the hollow of the water supply pipe 105 and transferring the water to the medium 111.

The medium 111 may be included in the port body 101. The medium 111 may be received in the port body 101. The medium 111 may include nutrients required for plant growth. For example, the medium 111 may be provided as bed soil, soil, or the like. The medium 111 may receive water from the suction member 110. Nutrients included in the medium 111 may be mixed with water transferred from the suction member 110. Nutrients mixed with water may be supplied to the roots of the plant.

A seed layer 112 may be included in the port body 101. The seed layer 112 may be received in the port body 101. The seed layer 112 may be disposed above the medium 111. Seeds of the plant may be disposed in the seed layer 112. The seed layer 112 may receive water mixed with nutrients from the medium 111. The seed layer 112 may support the seeds of the plant. The seed layer 112 may be penetrated by the root of the plant. The root of the plant penetrating the seed layer 112 may grow in a direction toward the medium 111. The seed layer 112 may prevent the plant growing in the seed layer 112 from contacting the medium 111. In other words, the seed layer 112 may allow the plant to grow clean. In addition, the seed layer 112 may facilitate the growth of the plant by creating an environment suitable for the growth of the plant to receive water from the medium 111.

The cultivation port 100 according to the present disclosure may receive water from the water supply bed 120 by the suction member 110. In this case, the plants sown in the cultivation port 100 may be intermittently supplied with water from the water supply bed 120. Since water is intermittently supplied from the water supply bed 120, water may be prevented from being excessively supplied to the cultivation port 100. The water of the water supply bed 120 may be supplied to the cultivation port 100 by the suction member 110. When water content is increased in the suction member 110, the medium 111, and the seed layer 112, the amount of water suctioned from the water supply bed 120 by the suction member 110 may be reduced.

The port body 101 may further include a cover 113. The cover 113 may cover an opened surface of the port body 101. The cover 113 may optionally be separated from the port body 101. The cover 113 may cover the opened surface of the port body 101 to protect a plant growing in the seed layer 112.

Hereinafter, the water supply bed 120 will be described in detail with reference to the drawings.

Referring to FIGS. 6 and 7, the water supply bed 120 according to the present disclosure may include a bed body 121 forming a body. The bed body 121 may be formed in a polygon in which one surface is opened. The bed body 121 may be formed in a basket shape by recessing a portion of one surface of the bed body 121. A plurality of cultivation ports 100 may be seated in the bed body 121. A space in which the plurality of cultivation ports 100 may be seated may be formed in the bed body 121.

The bed body 121 may include an inflow portion 122. The inflow portion 122 may be formed at one side of the bed body 121. The inflow portion 122 may be understood as a place where water supplied from the auxiliary storage unit 50 flows. In the present embodiment, the inflow portion 122 may protrude outward from one side of the bed body 121. Space through which water flows may be formed in the inflow portion 122. The inflow portion 122 may be connected to the water supply flow path 125 to be described later. Water flowing into the inflow portion 122 may flow along the water supply flow path 125 formed by the water channel 123 to be described later.

The bed body 121 may include a water channel 123. The water channel 123 may form a space in which water may flow or be stored in the bed body 121. The water channel 123 may protrude upward from an inner bottom surface of the bed body 121. The water channel 123 may include a first wall 123a and a second wall 123b. Each of the first wall 123a and the second wall 123b may protrude upward from an inner bottom surface of the bed body 121. The first wall 123a and the second wall 123b may be spaced apart from each other. A water supply flow path 125 through which water flows may be formed between the first wall 123a and the second wall 123b. The water supply flow path 125 may flow water flowing into the inflow portion 122. In this embodiment, one end portion of the first wall 123a and one end portion of the second wall 123b may be connected to an inner surface of the bed body 121. In addition, the other end portion of the first wall 123a and the other end portion of the second wall 123b may be connected to each other. The first wall 123a and the second wall 123b may be spaced apart from each other at regular intervals. The water supply flow path 125 may be positioned between the first wall 123a and the second wall 123b.

The water supply flow path 125 may include a plurality of flow paths 126, 127, and 128. A portion of the water supply flow path 125 may be branched into the first flow path 126, the second flow path 127, and the third flow path 128. The first flow path 126, the second flow path 127, and the third flow path 128 may be formed by the water channel 123 together with the water supply flow path 125. The first flow path 126, the second flow path 127, and the third flow path 128 may be spaced apart from each other. The first flow path 126, the second flow path 127, and the third flow path 128 may extend in a direction from one inner surface of the bed body 121 toward the other inner surface. In the present embodiment, the first flow path 126 may be disposed closer to the inflow portion 122 than the second flow path 127. The second flow path 127 may be disposed closer to the inflow portion 122 than the third flow path 128. When water is supplied from the inflow portion 122 to the water supply flow path 125, water may be supplied from the water supply flow path 125 in the order of the first flow path 126, the second flow path 127, and the third flow path 128. The first flow path 126, the second flow path 127, and the third flow path 128 may be defined as a flow path for supplying water flowing into the water supply flow path 125 into the plurality of cultivation ports 100 by the inflow portion 122.

The water channel 122 may include a water supply pipe disposition unit 124. The water supply pipe disposition unit 124 may be formed in the first flow path 126, the second flow path 127, and the third flow path 128. The water supply pipe disposition unit 124 may be defined as a space in which the water supply pipe 105 of the cultivation port 100 is disposed. The water supply pipe disposition unit 124 may be formed by the water channel 123. The water supply pipe disposition unit 124 may be formed by deforming a portion of the water channel 123 into a shape corresponding to the water supply pipe 105. For example, the water supply pipe disposition unit 124 may be deformed into a shape in which the first wall 123a corresponds to one side of the water supply pipe 105, and the second wall 123b may be formed in a shape corresponding to the other side of the water supply pipe 105. The water supply pipe disposition unit 124 may be formed by bending the first wall 123a and the second wall 123b.

A plurality of water supply pipe disposition units 124 may be provided. The water supply pipe disposition unit 124 may be provided in each of the first flow path 126, the second flow path 127, and the third flow path 128. The water supply pipe disposition units 124 which are different from each other may be spaced apart from each other. In the present embodiment, the water supply pipe disposition unit 124 may be disposed at one side and the other side of the first flow path 126, the second flow path 127, and the third flow path 128, respectively.

The water supply bed 120 may include a plurality of sensors 130 and 131. The sensors 130 and 131 may detect a supply amount of water supplied to the water supply flow path 125. In this embodiment, the sensors 130 and 131 may include a first sensor 130 and a second sensor 131. The first sensor 130 may output an electrical signal, and the second sensor 131 may receive an electrical signal output from the first sensor 130. Electrical signals input or output from the first sensor 130 and the second sensor 131 may be transmitted by water supplied to the water supply flow path 125. In other words, the first sensor 130 and the second sensor 131 may detect the amount of water supplied to the water supply flow path 125 depending on whether the first sensor 130 and the second sensor 131 are energized with each other by water.

The first sensor 130 may be disposed in the inflow portion 122. The second sensor 131 may be disposed at one end portion of any one of the plurality of flow paths 126, 127, and 128 located at a position farthest from the inflow portion 122. In this embodiment, the first sensor 130 may be disposed at the inflow portion 122, and the second sensor 131 may be disposed at one end portion of the third flow path 128. Water supplied to the water supply flow path 125 by the inflow portion 122 may flow in the order of the first flow path 126, the second flow path 127, and the third flow path 128. When the second sensor 131 is disposed in the flow path disposed at the furthest position from the inflow portion 122, the problem of not supplying water can be minimized. When the first sensor 130 and the second sensor 131 are energized with each other by water, the first sensor 130 and the second sensor 131 may sense that the water supplied to the inflow portion 122 reaches the third flow path 128. When water is supplied to the third flow path 128, it may be recognized that water is also supplied to the first flow path 126 and the second flow path 127. This is because the first flow path 126 and the second flow path 127 are disposed closer to the inflow portion 122 than the third flow path 128.

When the cultivation port 100 is seated on the water supply bed 120 according to the present disclosure, the water supply pipe 105 of the cultivation port 100 may be disposed in the water supply pipe disposition unit 124 of the water supply bed 120. When the water supply pipe 105 is disposed in the water supply pipe disposition unit 124, water supplied by the water supply flow path 125 may flow into the water supply pipe 105. In addition, the water supplied by the water supply flow path 125 may be supplied to each of the water supply pipes 105 of the plurality of cultivation ports 100. Water flowing into the water supply pipe 105 may be suctioned by the suction member 110 and transferred to the medium 111.

According to this configuration, water remaining in the water supply bed 120 may be minimized when water is supplied to the cultivation port 100. Since the amount of water supplied to the water supply bed 120 may be adjusted by the auxiliary storage unit 50, it is possible to minimize the excessive supply of water to the water supply bed 120.

Figure 8:
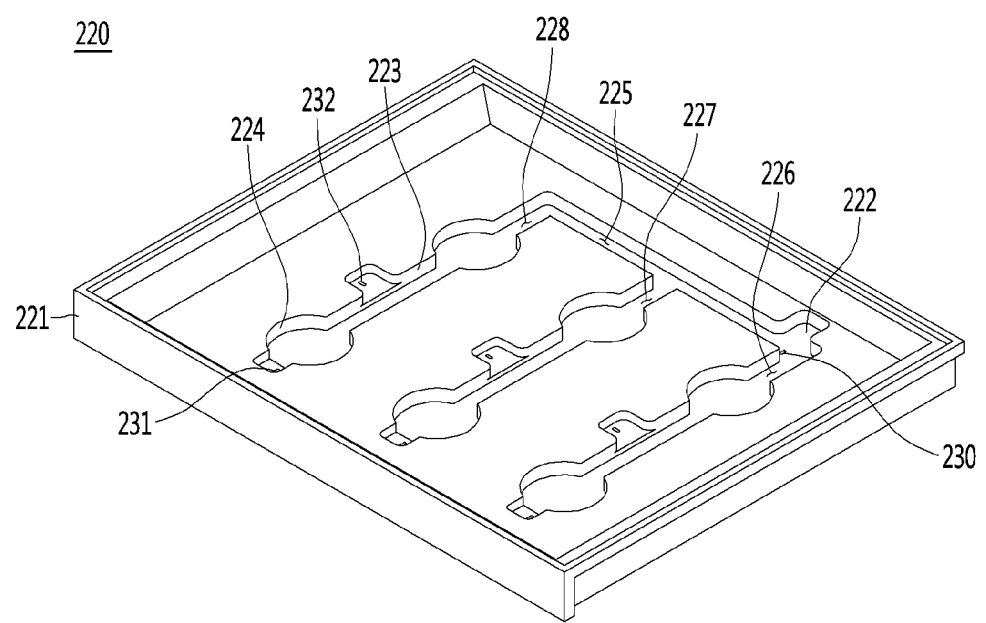
FIG. 8 is a perspective view illustrating a water supply bed of a plant cultivating apparatus according to a second embodiment of the present disclosure.

FIG. 8 is a perspective view illustrating a water supply bed of a plant cultivating apparatus according to a second embodiment of the present disclosure.

The water supply bed 220 according to the second embodiment of the present disclosure is characterized in that a specific portion of the water supply bed according to the first embodiment is deformed. Therefore, some components of the water supply bed 220 according to the second embodiment may be the same as the configuration of the water supply bed according to the first embodiment. Thus, portions omitted from the description of the plant cultivating apparatus according to the second embodiment are the same as the plant cultivating apparatus according to the first embodiment, and the same description can be cited. Hereinafter, a specific portion of the water supply bed 220 according to the second embodiment modified from the water supply bed according to the first embodiment will be described.

Referring to FIG. 8, the water supply bed 220 according to the second embodiment of the present disclosure may include a bed body 221 forming a body. In this embodiment, the bed body 221 may be formed in a polygon in which one surface is opened. The bed body 221 may be formed in a basket shape by recessing a portion of one surface of the bed body 221 which is opened. A plurality of cultivation ports may be seated in the bed body 221.

The bed body 221 may include an inflow portion 222. The inflow portion 222 may be disposed in the bed body 221. The inflow portion 222 may be understood as a place where water supplied from the auxiliary storage unit 50 flows. In the present embodiment, the inflow portion 222 may be formed by opening one surface of the bed body 221. The inflow portion 222 may form a space in which the water supplied from the auxiliary storage unit 50 flows. The inflow portion 222 may be connected to the water supply flow path 225 which will be described later. Water flowing into the inflow portion 222 may flow along the water supply flow path 225.

The bed body 221 may include a water channel 223. In this embodiment, the water channel 223 may be formed on an inner bottom surface of the bed body 221. The water channel 223 may be formed by recessing the bottom surface of the bed body 221 downward. The water supply flow path 225 may be formed by the water channel 223. In other words, the water supply flow path 225 may be defined as a space in which the bottom surface of the bed body 221 is recessed downward.

The water supply flow path 225 may include a plurality of flow paths. The plurality of flow paths may be formed by branching a portion of the water supply flow path 225. The plurality of flow paths may be formed by branching into the first flow path 226, the second flow path 227, and the third flow path 228. The first flow path 226, the second flow path 227, and the flow path 228 may be spaced apart from each other. Water supplied to the water supply flow path 225 may flow into the first flow path 226, the second flow path 227, and the third flow path 228.

The water channel 223 may include a water supply pipe disposition unit 224. The water supply pipe disposition unit 224 may be formed in the first flow path 226, the second flow path 227, and the third flow path 228. The water supply pipe disposition unit 224 may be defined as a space in which the water supply pipe 105 of the cultivation port 100 is disposed. The water supply pipe 105 may protrude downward from the bottom surface of the cultivation port 100. The water supply pipe disposition unit 224 may be formed in a shape corresponding to the water supply pipe 105. The water supply pipe disposition unit 224 may be formed by recessing a portion of the water channel 223 to correspond to the water supply pipe 105. For example, a portion of the water channel 223 may be further recessed in a direction toward both side surfaces of the bed body 221 from the water channel 223. The water supply pipe 105 may receive water supplied to the water supply flow path 225 in a state where the water supply pipe 105 is disposed in the water supply pipe disposition unit 224.

The water supply bed 220 may include a plurality of sensors. The plurality of sensors may detect a supply amount of water supplied to the water supply flow path 225 of the water supply bed 220. The plurality of sensors may include a first sensor 230, a second sensor 231, and a third sensor 232.

The first sensor 230 may be disposed adjacent to the inflow portion 222, and the first sensor 230 may output an electrical signal. The second sensor 231 may be provided in at least one of the plurality of flow paths and disposed at one end portion of the provided flow path. The second sensor 231 may receive an electrical signal output from the first sensor 230. The third sensor 232 may be provided in at least one of the plurality of flow paths and may be disposed between the first sensor 230 and the second sensor 231. The third sensor 232 may receive an electrical signal output from the first sensor 230. In other words, when water is supplied to the water supply flow path 225, the supplied water may be in contact with the first sensor 230, the third sensor 232, and the second sensor 231 in this order. When the water is in contact with a plurality of sensors, electrical signals output from the first sensor 230 by the water may be transmitted to one or more of the second sensor 231 and the third sensor 232.

For example, when the electrical signal output from the first sensor 230 is input to the third sensor 232, it can be recognized that the water supplied to the water supply flow path 225 has been reached the flow path where the third sensor 232 is located. It can be recognized that water has reached the flow path where the third sensor 232 is located, and the water may be additionally supplied so that water reaches the one end portion of the flow path where the second sensor 231 is located.

In other words, by detecting that the electrical signal output from the first sensor 230 is input to the second sensor 231 and the third sensor 232, the amount of water supplied to the water supply flow path 225 can be determined. It is possible to adjust whether or not the water supplied to the water supply bed 220 is supplied by using a water supply amount detected through a plurality of sensors.

EXPLANATION OF REFERENCE NUMERAL

| | |
|---|---|
| 1: plant cultivating apparatus | 10: body |
| 25: bed support unit | 30: light source module |
| 35: ventilation unit | 40: main storage unit |
| 45: pump | 50: auxiliary storage unit |
| 100: cultivation port | 120: water supply bed |

What is claimed is:

1. A plant cultivating apparatus comprising:
a body that defines a cultivation chamber therein;
a water storage configured to be disposed in the body and to store water;
a water supply bed configured to be disposed at one side of the cultivation chamber, the water supply bed having a water supply flow path that is defined in the water supply bed and that is configured to receive water from the water storage; and
a cultivation port configured to be seated on the water supply bed and to receive water from the water supply flow path,
wherein the cultivation port includes:
a water supply pipe that extends downward from a bottom surface of the cultivation port and that has a hollow interior, the water supply pipe including a porous portion configured to filter foreign matters in water flowing into the hollow interior of the water supply pipe,
a suction member disposed in the hollow interior of the water supply pipe and configured to suction water stored in the water supply flow path,
a medium that is disposed above the suction member, that is configured to receive water from the suction member, and that is configured to store nutrients for a plant, and
a plurality of pedestals that extend downward from the bottom surface of the cultivation port and that spaced apart from each other,
wherein the water supply bed further includes a water channel that protrudes upward from an inner bottom surface of the water supply bed and that defines the water supply flow path configured to store water,
wherein the plurality of pedestals are disposed outside of the water channel, and
wherein the water supply pipe is disposed inside of the water channel and configured to receive the water stored in the water supply flow path.

2. The plant cultivating apparatus of claim 1, wherein the water supply pipe includes at least one recessed portion that is disposed at one end portion of the water supply pipe,
wherein a portion of the water supply pipe is opened to the at least one recessed portion, and
wherein the porous portion is disposed at the one end portion of the water supply pipe and covers at least a portion of the hollow interior of the water supply pipe.

3. The plant cultivating apparatus of claim 1, wherein the cultivation port further includes:
a seed layer disposed above the medium and configured to support a seed of the plant; and
a cover that covers a surface of the cultivation port.

4. The plant cultivating apparatus of claim 1, wherein the water channel includes:
a first wall defining a first side surface of the water supply flow path; and
a second wall defining a second side surface of the water supply flow path, and
wherein a portion of the water supply pipe is located between the first wall and the second wall.

5. The plant cultivating apparatus of claim 4, wherein the water channel includes a water supply pipe disposition unit which is formed by bending a portion of the first wall to correspond to one side of the water supply pipe and by bending a portion of the second wall to correspond to another side of the water supply pipe.

6. The plant cultivating apparatus of claim 5, wherein the water supply flow path is branched into a plurality of flow paths, and
wherein the plurality of flow paths are spaced apart from each other, and the water supply pipe disposition unit is formed in each flow path of the plurality of flow paths.

7. The plant cultivating apparatus of claim 4, wherein each of the first wall and the second wall protrudes upward from the inner bottom surface of the water supply bed and faces side surfaces of the water supply pipe and the plurality of pedestals.

8. The plant cultivating apparatus of claim 4, wherein the first wall extends through a first region between an outer circumferential surface of the water supply pipe and one of the plurality of pedestals, and
wherein the second wall extends through a second region between the outer circumferential surface of the water supply pipe and another of the plurality of pedestals.

9. The plant cultivating apparatus of claim 1, wherein the water supply flow path is recessed downward from the inner bottom surface of the water supply bed, and wherein the water supply flow path is further recessed downward than the water supply pipe.

10. The plant cultivating apparatus of claim 9, wherein the water channel includes a water supply pipe disposition unit that defines a portion of the water channel and that is configured to receive the water supply pipe.

11. The plant cultivating apparatus of claim 1, wherein the water supply bed includes an inflow portion that is connected to the water supply flow path, that is configured to receive water supplied from the water storage, and that protrudes from a portion of the water supply bed.

12. The plant cultivating apparatus of claim 11, further comprising a plurality of sensors disposed in the water supply flow path, wherein the plurality of sensors comprise:
a first sensor disposed at the inflow portion and configured to output a signal; and
a second sensor disposed at one end portion of the water supply flow path away from the inflow portion and configured to receive the signal output from the first sensor.

13. The plant cultivating apparatus of claim 12, wherein the water supply flow path is configured to electrically connect the first sensor and the second sensor to each other through water supplied to the inflow portion, and wherein the second sensor is configured to receive the signal of the first sensor through the water guided through the water supply flow path.

14. The plant cultivating apparatus of claim 1, wherein the water storage includes:
a main storage configured to store water; and
an auxiliary storage that is disposed above the main storage, that is configured to receive a preset amount of water from the main storage, and that is configured to supply a preset amount of water to the water supply bed.

15. The plant cultivating apparatus of claim 14, wherein the body includes:
a pump configured to supply water stored in the main storage to the auxiliary storage.

16. The plant cultivating apparatus of claim 15, wherein the body further includes:
a supply pipe that is connected to the pump and that is configured to supply water stored in the main storage into the auxiliary storage; and
a recovery pipe that is configured to, based on an excess amount of water being supplied to the auxiliary storage, collect and provide the excess amount of water to the main storage.

17. The plant cultivating apparatus of claim 1, wherein the water supply bed includes an inflow portion that is connected to the water supply flow path, that is configured to receive water supplied from the water storage, and that is disposed within the water supply bed.

18. The plant cultivating apparatus of claim 1, wherein the porous portion is disposed at a bottom end of the water supply pipe, the bottom end being configured to face the water supply bed.

19. The plant cultivating apparatus of claim 18, wherein the suction member extends to an upper end of the water supply pipe and is in contact with the medium.

20. The plant cultivating apparatus of claim 18, wherein the suction member is disposed on the porous portion.

* * * * *